Figure 3:
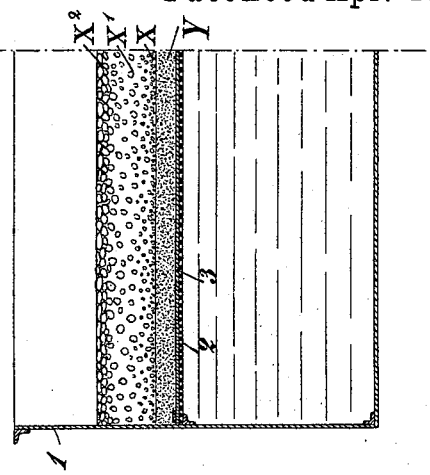

(No Model.) 2 Sheets—Sheet 1.

G. OLBERG.
PURIFYING CONDENSATION WATER FROM OIL BY FILTRATION.

No. 602,098. Patented Apr. 12, 1898.

Witnesses:
E. B. Bolton
O. D. Munk

Inventor:
Gustav Olberg
By Richards
his Attorneys.

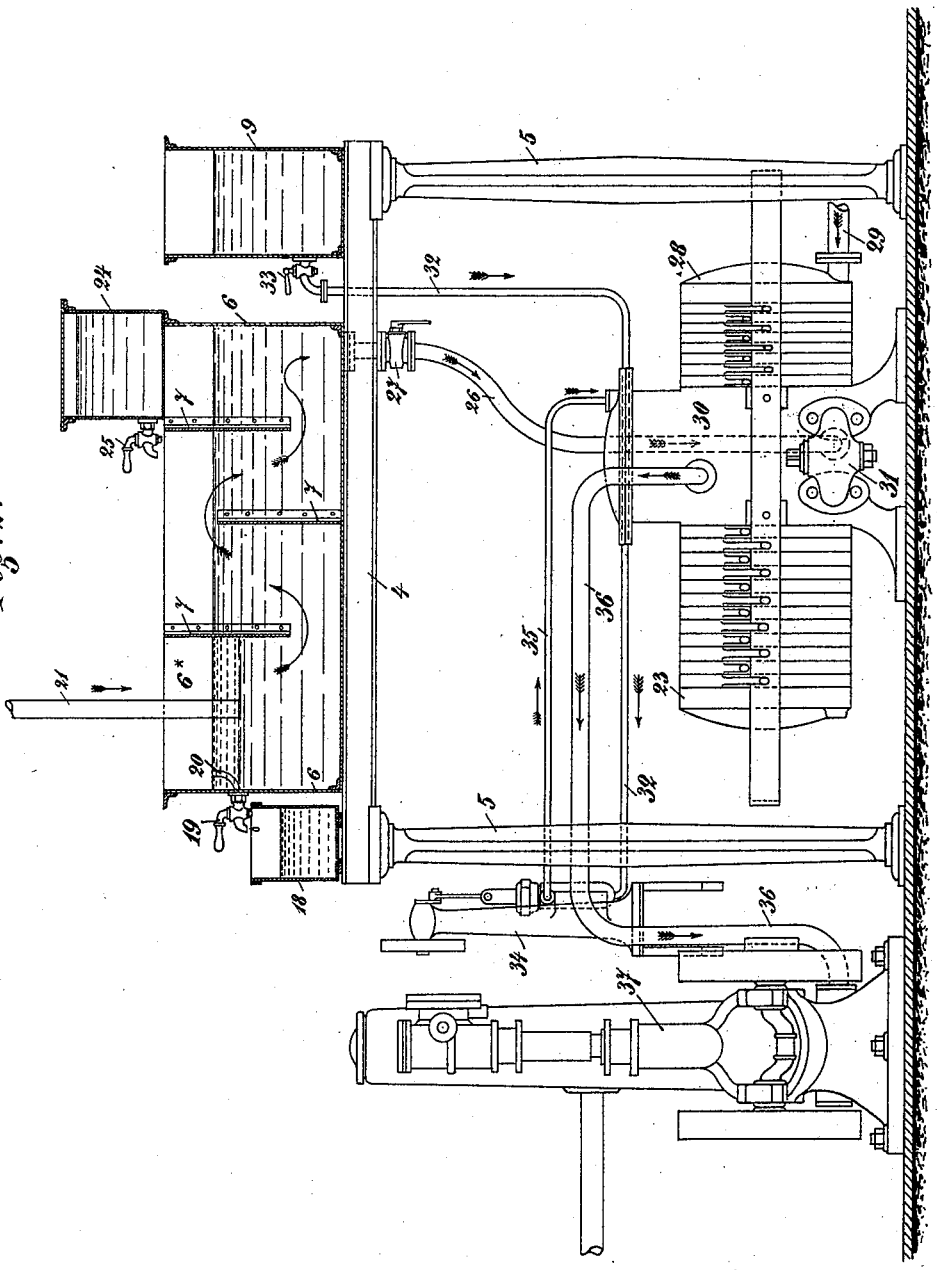

UNITED STATES PATENT OFFICE.

GUSTAV OLBERG, OF GREVENBROICH, GERMANY, ASSIGNOR TO THE MASCHINENFABRIK GREVENBROICH, ACTIENGESELLSCHAFT, OF SAME PLACE.

PURIFYING CONDENSATION-WATER FROM OIL BY FILTRATION.

SPECIFICATION forming part of Letters Patent No. 602,098, dated April 12, 1898.

Application filed February 17, 1897. Serial No. 623,877. (No specimens.) Patented in Germany March 22, 1894, No. 90,116, and in England December 24, 1895, No. 24,708.

*To all whom it may concern:*

Be it known that I, GUSTAV OLBERG, doctor of philosophy, a subject of the King of Prussia, Emperor of Germany, residing at Grevenbroich, in the Kingdom of Prussia, Germany, have invented a new and useful Method of Purifying the Condensation-Water of Steam-Engines from Lubricating-Oil by Filtration, (for which I have obtained a patent in Germany, No. 90,116, dated March 22, 1894, and in Great Britain, No. 24,708, dated December 24, 1895;) and I do hereby declare that the following is a full, clear, and exact description of the invention, which will enable others skilled in the art to which it appertains to make and use the same.

The present invention relates to the purification of the condensation-water of steam-engines from the lubricating-oil, and more particularly to the process of effecting said purification by means of filtration.

The method as hitherto practiced for carrying out the process of removing the lubricating-oil from the condensation-water of steam-engines consists in causing the water to permeate layers of sawdust which are one meter or more deep. This method has proved unsatisfactory, as on the one hand the retaining power of the sawdust as regards the extremely finely-divided oil is but very weak, and, on the other hand, to obtain the small result possible a very frequent replacement of the sawdust layers by fresh ones is required. It is obvious that the considerable bulk of filtering material and the necessity of having large quantities of same on hand make the employment of the said method on board ship impracticable.

Now on board of sea-going ships it is of great importance to be enabled to free the condensation-water from the lubricating-oil by simple filtration, and it is the main object of the present invention to render this feasible.

To this end it consists in substituting for the thick sawdust layers thin mineral layers composed of fine flaky particles, such as are obtained by the precipitation of certain salts—for instance, salts of alkaline earth metals, earth metals, and others well known to chemists—provided such precipitate has no chemical effect on the oil.

I have discovered that the flaky deposits obtained by precipitation from solutions of the salts of earth alkali and earth metals by means of alkali hydrates and carbonates, though permeable to water, do not allow oils to pass through them unless under considerable pressure; but then the particles composing the deposit are packed so closely together as to become totally unfit as a filtering medium. Moreover, I have found that the said deposit manifests this impermeability to oils when the latter are finely divided in a bulk of water, so as to form what is designated by the term "emulsion." If such an emulsion is continually led onto a layer of the nature mentioned formed on a permeable body, the minute oil-drops are retained on the surface of the layer. The thus retained minute drops are easily displaced by the liquid, and thereby caused to unite into larger drops until the latter increase to such a volume that they overcome the pressure of the water by virtue of their smaller specific gravity and rise to the surface of the liquid. I avail myself of this discovery for the extraction of the oil present in the state of a very fine division in the water obtained by the condensation of steam in the condensers of steam-engines in order to make said water fit for reuse and feed-water.

Filtering layers adapted to the purpose set forth may be obtained by covering a permeable bed with a thin layer of the flaky precipitate. As such precipitate may be used those obtained by precipitating solutions of salts of calcium, magnesium, aluminium, and the like with hydrates and carbonates of the alkali metals. I prefer to employ the calcareous mud obtained in the process of purifying the feed-water of boilers previous to feeding it into the boiler, as also the precipitate of calcium carbonate obtained as a by-product in the manufacture of caustic soda, since these materials offer the important advantage of causing no, or but very little, cost. In most cases the thickness of the filtering layer need not be more than three millimeters.

The layer of filtering material may in all cases be formed either within the filtering apparatus employed or outside such apparatus, as may be desired; but the preferable course is to form it in the apparatus itself, making such formation a preparatory stage of the filtering process proper. For this purpose the filtering substance previously prepared or obtained in the form of a fine flaky precipitate—such, for example, as the calcareous mud or sediment already referred to—should be stirred up in a suitable quantity of water, which is caused to pass through the apparatus before the condensation-water to be filtered is allowed to enter the apparatus. If desired, the initial portion of the condensation-water may thus be used for introducing the precipitate into the apparatus, or the mineral filtering layer may be produced within the apparatus before the admission of the water of condensation by precipitation in the well-known manner out of a sufficient quantity of feed-water or a watery solution prepared with salts of the mineral substances constituting the boiler sediments or similar substances.

The proper degree of filtering pressure should be previously ascertained by tests—that is to say, by determining that pressure at which the eliminated oil commences to permeate the filter along with the water, the filtering pressure proper being so regulated as to be lower than the said pressure.

Whereas this invention therefore enables efficient filtering layers, offering an extensive area, to be formed by the employment of but little material, it, on the other hand, practically does away with the expense which the necessity of procuring filtering material generally entails, since it permits the calcareous muddy precipitate from boiler feed-water to be utilized.

Though filtering-bags may be employed in carrying out this process, filtering-presses are to be preferred, and that, besides other obvious reasons, because the filtering plates or frames of such presses become quite uniformly covered or coated with the precipitate employed as filtering medium when the same is introduced into or produced within the filtering-press in the manner described.

Figure 1:
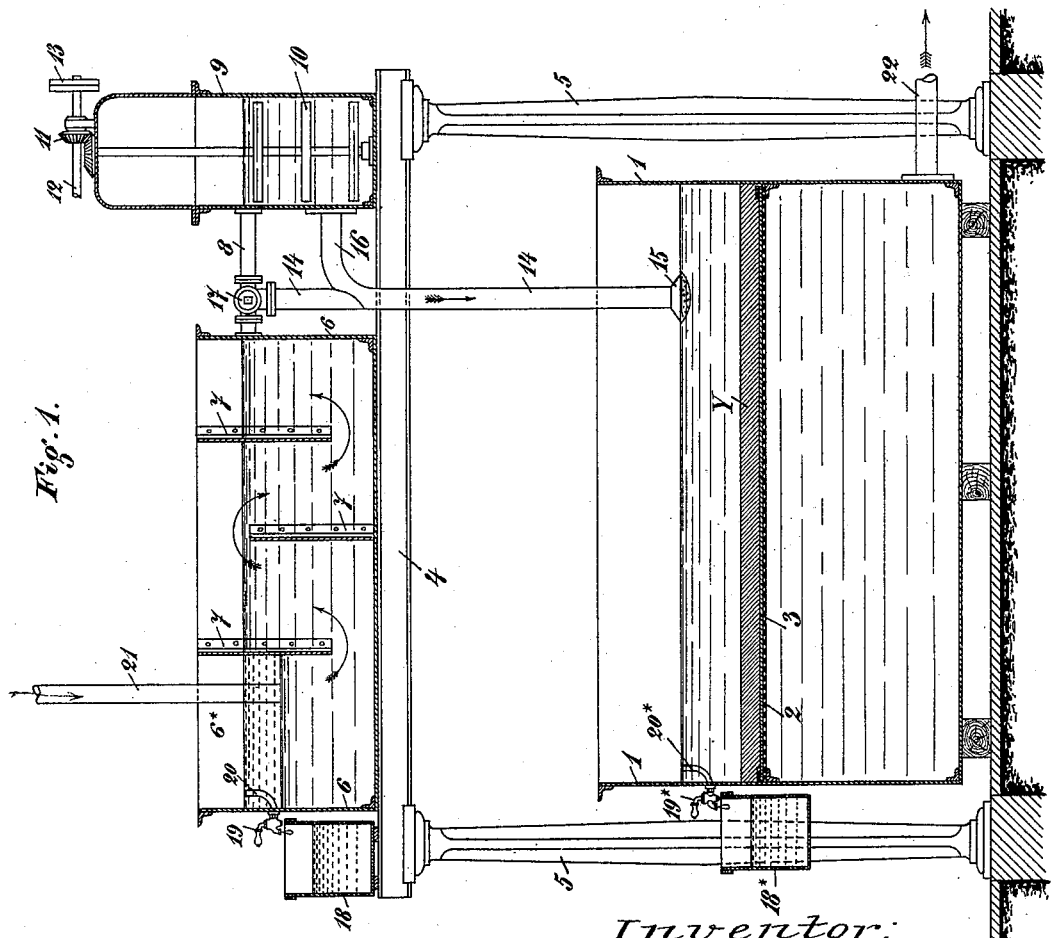

On the annexed two sheets of drawings, Figure 1 shows the invention as applied to an ordinary open filter, and Fig. 2 to a filter-press. In Fig. 1 the filtering layer is supposed to consist in a thin layer of the calcareous mud precipitated from feed-water for boilers previous to feeding it into the latter, whereas in Fig. 2 the precipitate for composing the filtering layers of the filter-press is obtained from a solution added to the condensation-water. Both figures are sectional elevations. Fig. 3 serves to illustrate the behavior of the oil retained on the surface of the filtering layer.

Referring to Fig. 1, 1 is a tank provided with a horizontal perforated partition 2, which is covered with a filtering-cloth 3. Above the tank 1 on a platform 4, supported by columns 5, is arranged a vessel 6, subdivided by vertical partitions 7, as shown. This vessel communicates through a pipe 8 with an open vessel 9, which is provided with a stirrer 10, connected by conical gearing 11 to shaft 12, which is rotated by means of the pulley 13. From the pipe 9 is branched off a pipe 14, which descends into the tank 1, where it terminates at a suitable level above the bed 3. The lower end of pipe 14 is provided with a rose 15. The lower part of vessel 9 communicates with pipe 14 through a pipe 16.

17 is a cock placed in the pipe 8 at the point where the descending pipe 14 is branched off. Adjacent to the other end of tank 1 is arranged on the platform 4 a collecting vessel 18, and above the latter the tank is provided with a cock 19, constituting the adjustable outflow of an oil-discharging pipe 20.

21 is the pipe through which the condensation-water is led into the first chamber 6* of tank 6—i. e., the space between the end wall of the tank and the first partition 7. The tank 1 is also provided with an oil-discharging tube 20*, adjustable by a cock 19* and discharging into a vessel 18*.

22 is a pipe connecting the lower part of tank 1 with the feed-pump, the latter being omitted from the drawings.

Supposing the cloth 3 not to be covered with the filtering layer of flaky mineral particles, the cock 17 is adjusted to cut off direct communication between the pipes 8 and 14, and the water to flow through the vessel 6, pipe 8, vessel 9, pipe 16, and pipe 14 into tank 1. During the passage of the water through the vessel 6 the partitions 7 of the latter cause the water to alternately descend and ascend, whereby the coarser drops of oil are allowed to separate from the water in the first compartment of vessel 6, said drops rising to the surface, where they collect into an oil stratum which discharges through pipe 20 into the collecting vessel 18. In order to produce the filtering layer on the bed 3, calcareous mud, preferably in its wet state, is introduced from the top into the vessel 9 and by means of the stirrer 10 intimately mixed with the water, which in percolating through the cloth 3 leaves the flaky mud particles on the latter, so as to cover the same with a thin even layer Y. In the drawings this layer Y is for clearness sake drawn on an exaggerated scale. After the layer has obtained a sufficient thickness the cock 17 is so adjusted as to cut off the communication between the vessels 6 and 9, when the water passes directly from the vessel 6 through pipe 14 into the tank 1. The minute drops of oil X carried by the water do not pass with the same through the flaky mineral layer Y, but are retained on the surface of the same, where they are caused by the agitating action of the descending water to unite into larger drops X' until the latter acquire such volume as allows them to rise to the surface, where they collect in an oil stratum $x^2$, as illustrated in Fig. 3, which shows in sectional elevation a portion of the tank 1 after a greater quantity of condensation-water has passed the filter. The oil thus separated from the water discharges through pipe 20* into the collecting vessel 18*. If desired, this arrangement of self-discharging may be omitted and the oil removed periodically.

In Fig. 2, 23 is a filter-press arranged below the platform carrying the vessels 6, 9, and 18. In this instance a vessel 24, provided with a cock 25, is arranged above the last chamber of vessel 6, so that its liquid contents can be discharged into the water. The bottom part of the vessel communicates through the pipe 26, having a cock 27, with a reheater 28 of suitable construction, preferably one composed of plates, which is fed with steam through the pipe 29. The reheater is in communication with a vessel 30 and the latter through cock 31 with the filter-press 23. This vessel serves for preparing the precipitate. The vessel 9 is connected through pipe 32, having a cock 33, with a small pump 34, and the latter through pipe 35 with the vessel 30.

36 is a pipe connecting the filter-press with the feed-pump 37. The vessel 24 receives the earthy-salt solution to be decomposed in the vessel 30 and the vessel 9 the lye for decomposing said salt.

Supposing the vessel 24 to be filled with the salt solution, and the vessel 9 with the decomposed lye and raw water—i. e., water which has not been purified—passing from pipe 21 through the vessel 6 into the reheater 28, the vessel 30, the filter-press 23, and out through pipe 36. The cocks 25 and 33 are opened. The salt solution discharges from the vessel 24 into the vessel 6, mixes with the raw water, and the mixture flows through the reheater into the vessel 30. Simultaneously the decomposed lye passes under the suction of pump 34 in the vessel 30 and is injected into the reheated mixture of raw water and earthy-salt solution, whereby precipitation is produced and simultaneously the precipitate, finely divided, into the bulk of liquid. From the vessel 30 the water mixed with the precipitate passes through the cock 31 and the filter-press, where the precipitate is deposited on the filtering-cloth with which the press is provided. As soon as the required thickness of deposit is obtained the cocks 25 and 23 are closed, the afflux of raw water stopped, and condensation-water caused to flow into the vessel 6 through pipe 21. For removing the oil from the respective compartments of the filter-press the same communicate at the top with a common channel discharging through a cock, as will readily be understood by those skilled in the art of constructing filter-presses. Instead of filling the vessels 24 and 9 with the solutions of the respective ingredients said solutions may be prepared in those vessels which in that instance are preferably provided with stirrers.

I claim as my invention—

1. The method of freeing the condensation-water of steam-engines from the lubricating-oil by filtration which consists in preparing a mixture of water and flaky mineral particles, separating the latter from the former by collecting them in the form of a thin layer on a permeable bed, and causing the condensation-water to filter through such mineral layer.

2. A filter for freeing condensation-water of steam-engines from lubricating-oil composed of a permeable bed and a thin mineral layer composed of calcareous mud which forms a layer of a flaky nature, substantially as described.

In testimony whereof I have hereunto set my hand in the presence of two subscribing witnesses.

GUSTAV OLBERG.

Witnesses:
ERNST MEISSER,
ADOLF SCHENCK.